Jan. 14, 1958   R. H. MARKS   2,819,467
AUTOMATIC MECHANISM FOR CLOSING AND CUTTING PAPER
SEAMLESS CIRCULAR TUBULAR KNITTED PRODUCTS
Filed Oct. 20, 1955   6 Sheets-Sheet 1

INVENTOR
Ronald H. Marks,
BY John B. Brady
ATTORNEY

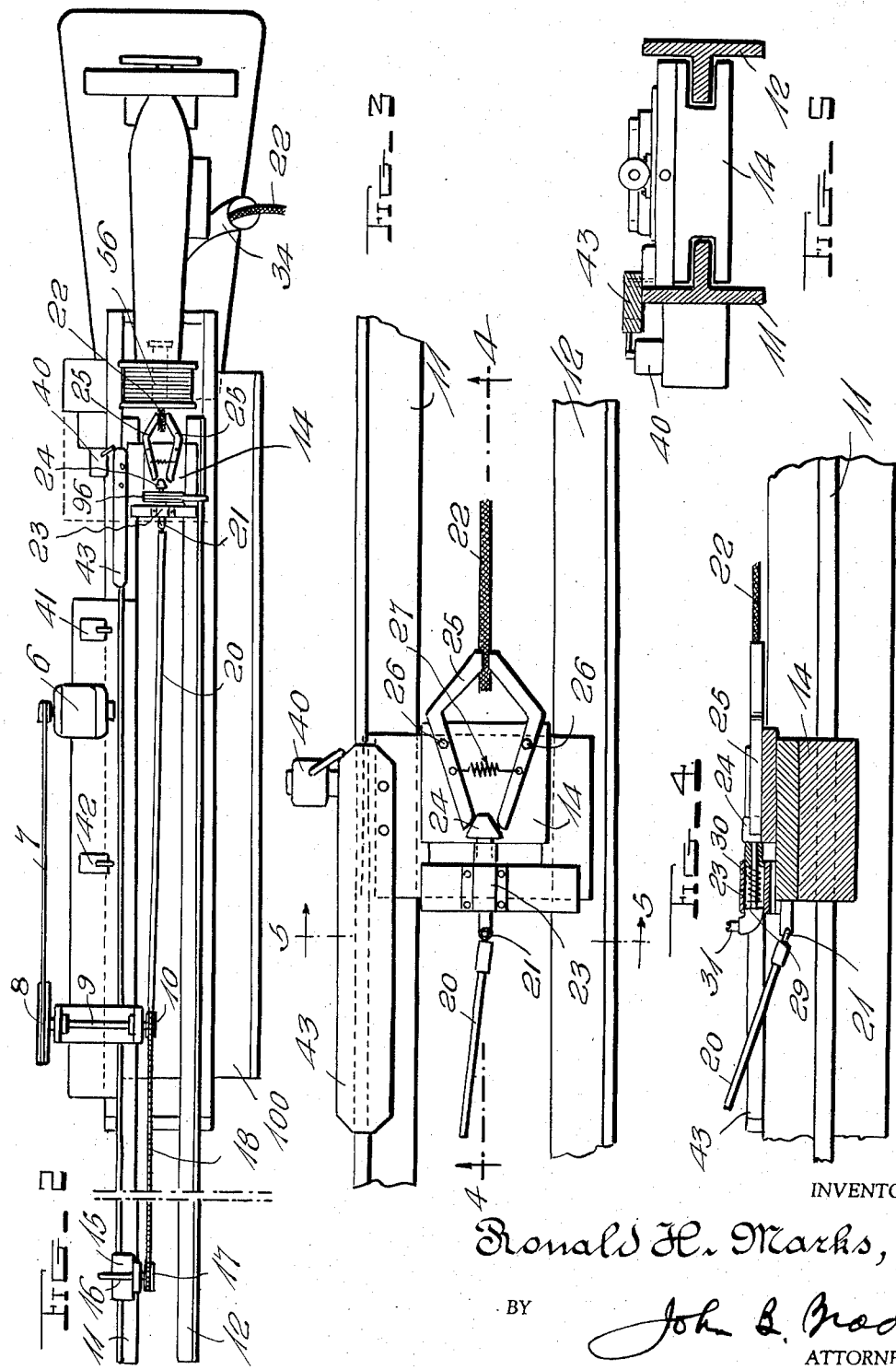

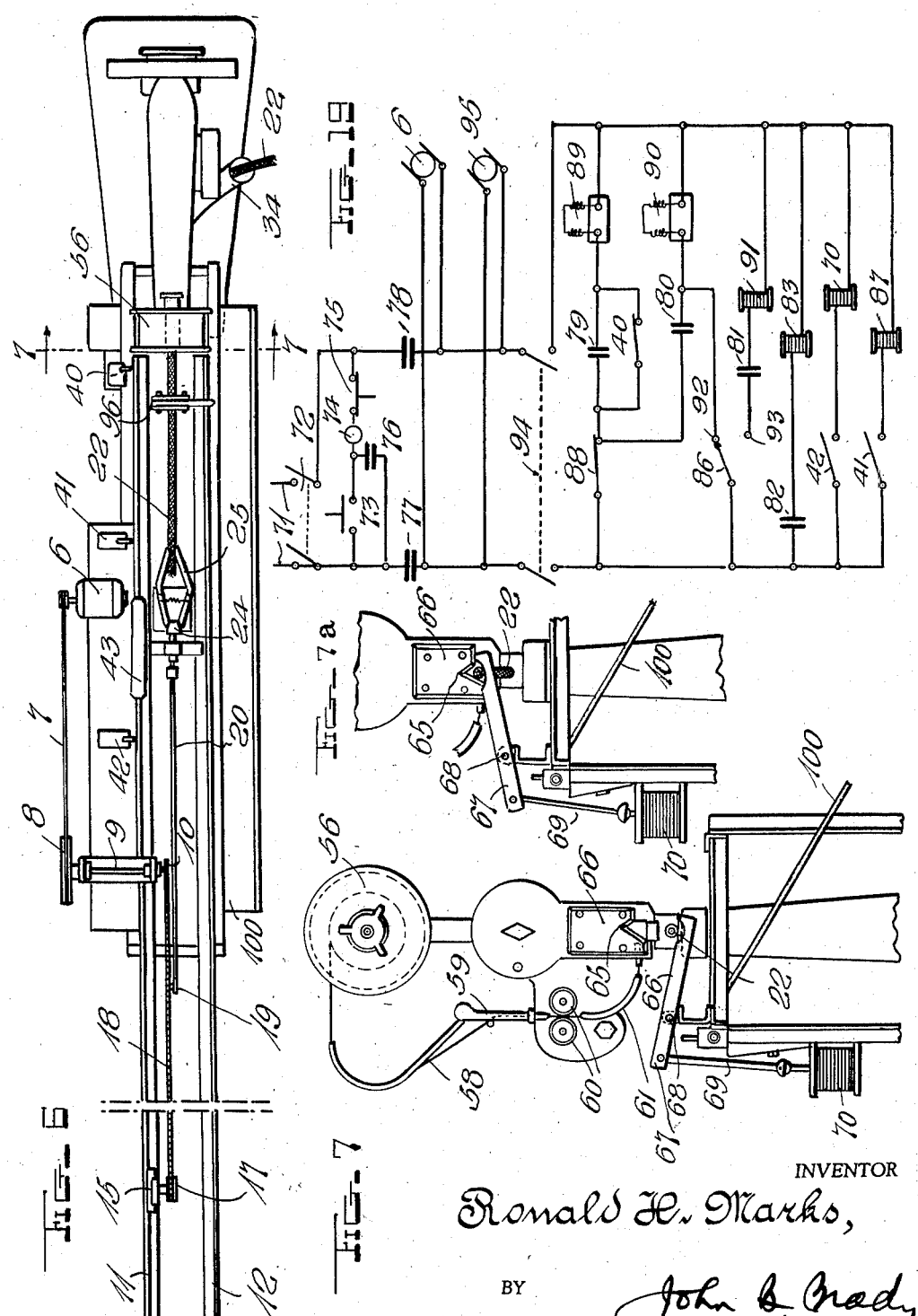

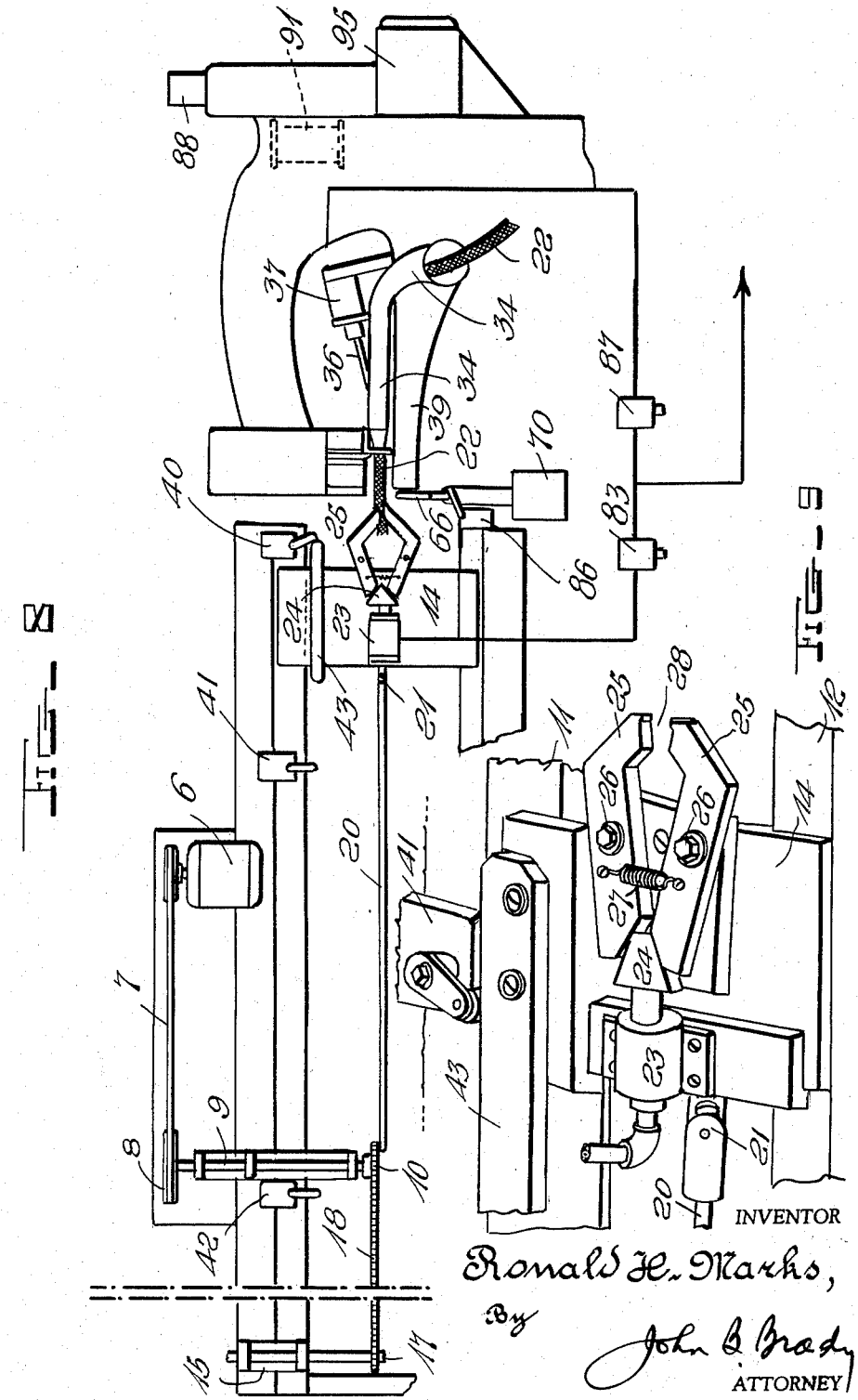

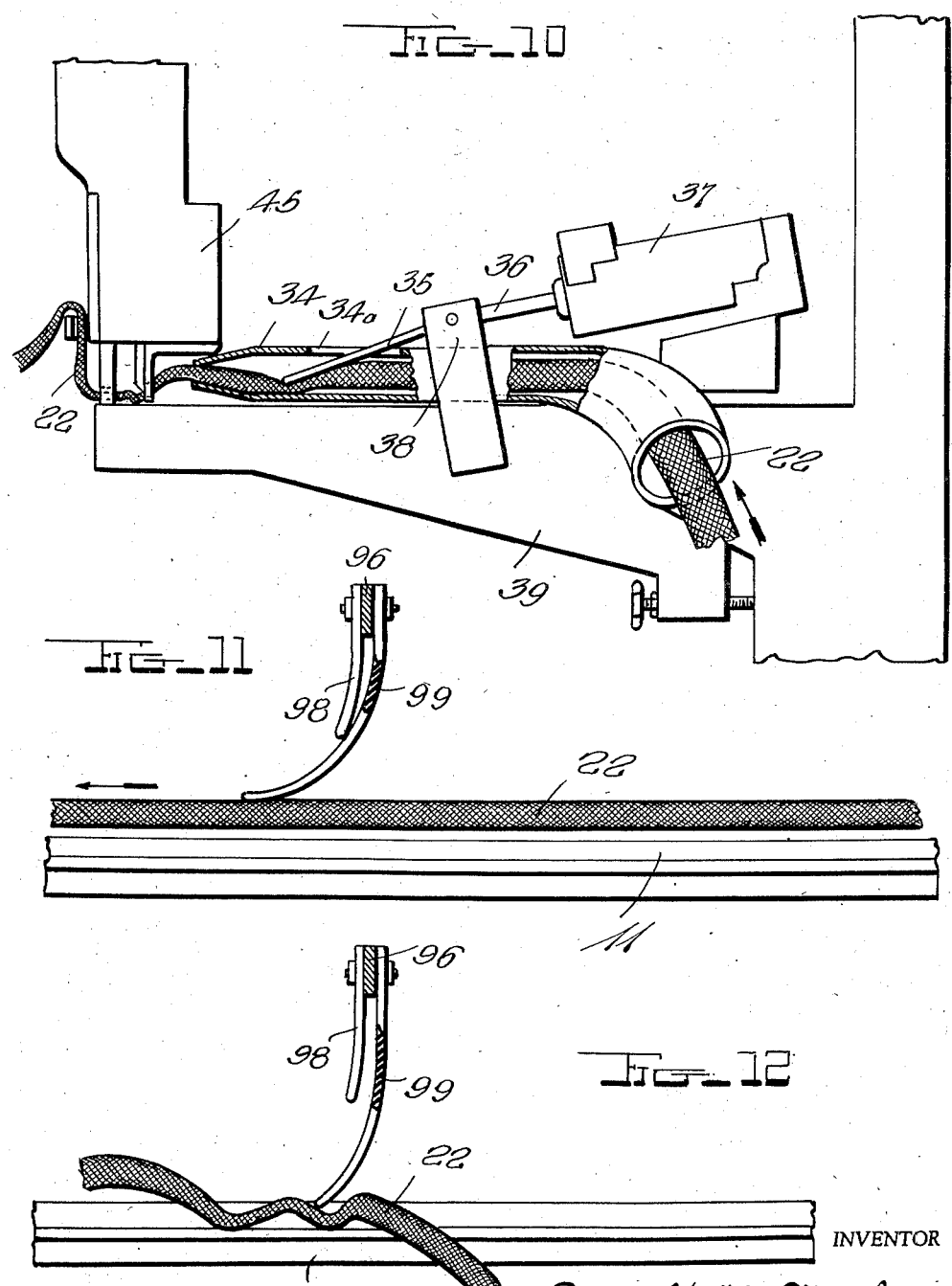

Jan. 14, 1958  R. H. MARKS  2,819,467
AUTOMATIC MECHANISM FOR CLOSING AND CUTTING PAPER
SEAMLESS CIRCULAR TUBULAR KNITTED PRODUCTS
Filed Oct. 20, 1955  6 Sheets-Sheet 6
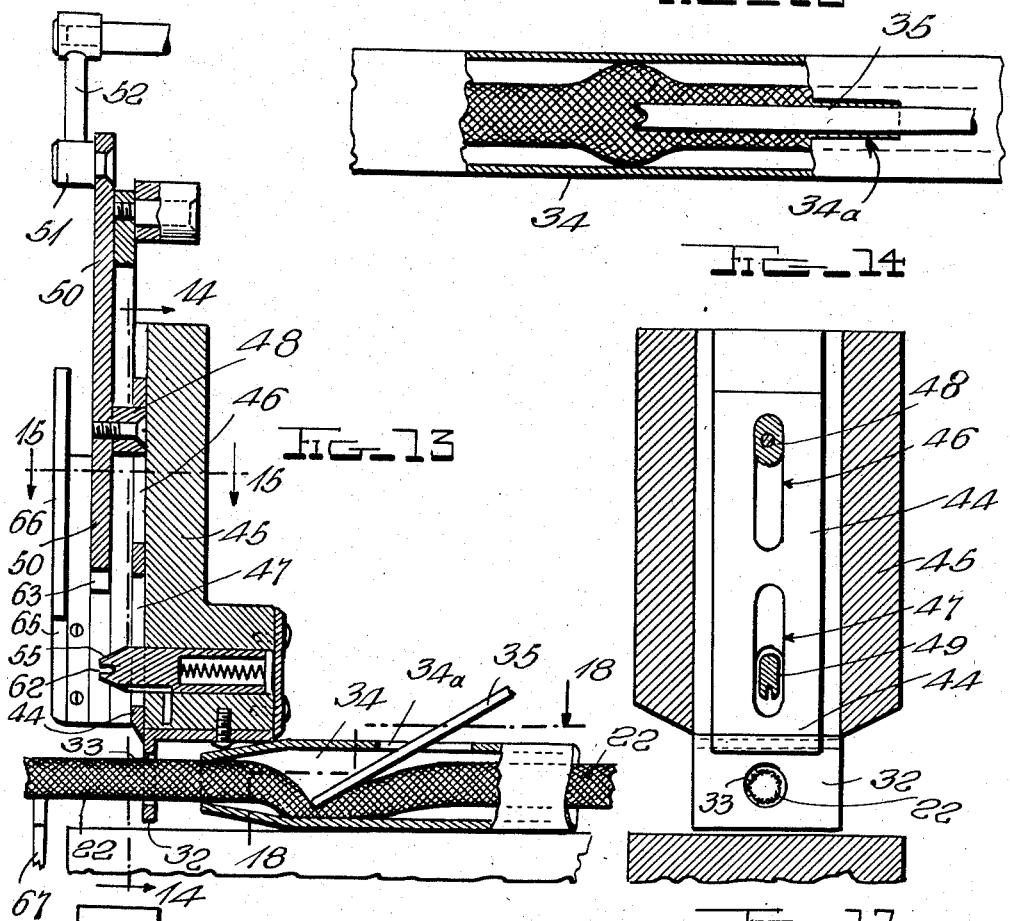
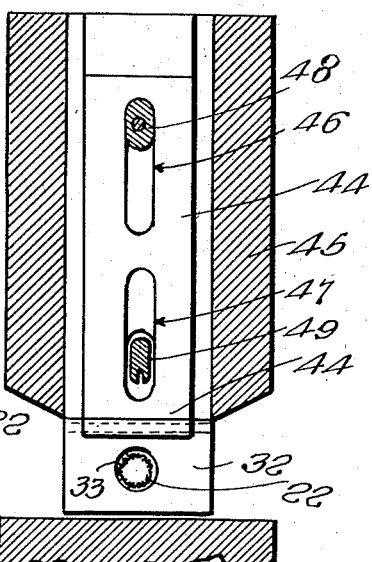
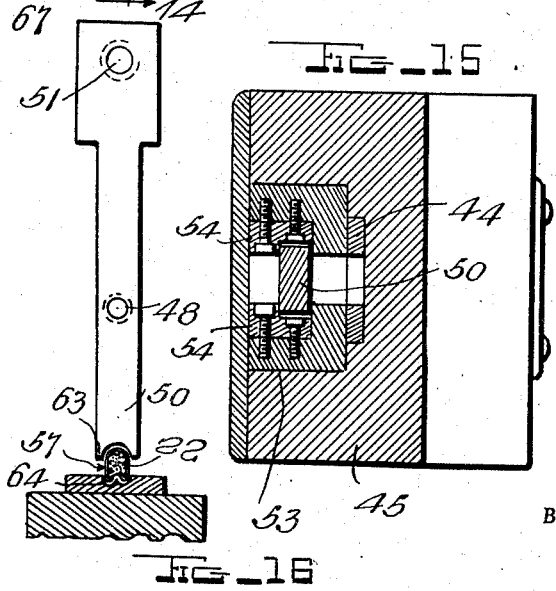
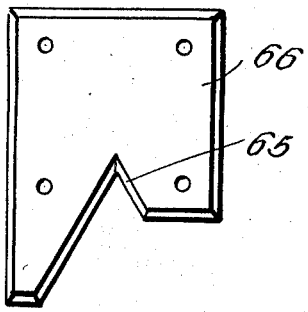
INVENTOR
Ronald H. Marks,
BY
John B. Brady
ATTORNEY

United States Patent Office 2,819,467
Patented Jan. 14, 1958

2,819,467

AUTOMATIC MECHANISM FOR CLOSING AND CUTTING PAPER SEAMLESS CIRCULAR TUBULAR KNITTED PRODUCTS

Ronald H. Marks, Dallas, Tex.

Application October 20, 1955, Serial No. 541,736

11 Claims. (Cl. 1—125)

My invention relates broadly to automatic machines for pulling, measuring and cutting material and more particularly to a machine for automatically pulling, measuring, forming and cutting material into bags.

One of the objects of my invention is to provide a machine for automatically pulling, measuring, forming and cutting material into bags at a high rate of speed with minimum labor.

Another object of my invention is to provide an arrangement of automatic machine which is adjustable in stroke for pulling, measuring and forming material into bags.

A further object of my invention is to provide a timing mechanism for automatic machines for governing the functions of pulling, measuring, forming and cutting material into bags in proper functional sequence relation.

Still another object of my invention is to provide an automatic clamping mechanism for pulling, measuring and cutting whereby material may be automatically advanced to a selected position at which it is cut and clamped for forming bags at a high rate of speed.

Other and further objects of my invention reside in an arrangement of bag-forming machine as set forth more fully in the specification hereinafter following by reference to the accompanying drawings, in which:

Fig. 2 is a top plan view of the automatic machine illustrated in Fig. 1, illustrating the pulling mechanism about to be advanced from the initial clamping position to a lineal displaced position;

Fig. 3 is an enlarged fragmentary plan view showing the clamping mechanism engaged over the end of the material to be pulled into measuring, forming and cutting position;

Fig. 4 is a fragmentary longitudinal sectional view on line 4—4 of Fig. 3;

Fig. 5 is a transverse sectional view taken substantially on line 5—5 of Fig. 3;

Fig. 6 is a plan view of the automatic machine of my invention similar to the view illustrated in Fig. 2, but showing the clamping mechanism in the process of being pulled, longitudinally of the machine, preparatory to a measuring, forming and cutting operation;

Fig. 7 is a transverse sectional view taken on line 7—7 of Fig. 6; Fig. 7a is a view similar to Fig. 7 showing the material raised prior to cutting;

Fig. 8 is an enlarged fragmentary view showing the clamping mechanism of the automatic machine engaged with the material to be pulled and illustrating schematically the arrangement of air valves which control the several functions of the automatic machine;

Fig. 9 is a perspective view of a fragmentary portion of the clamping mechanism and illustrates particularly the pneumatically operated mechanism for controlling the clamping mechanism;

Fig. 10 is a detailed view partially broken away and illustrated in section showing the action during the clamping operation;

Fig. 11 is a fragmentary detail view partially in section showing the manner in which the material is maintained in tension during the pulling operation;

Fig. 12 is a detail fragmentary view partially in section showing the arrangement of the deflector for directing the material downwardly after release;

Fig. 13 is a vertical longitudinal sectional view through the stapling head of the automatic machine of my invention, the view showing on an enlarged scale the position after cut-off an action of the associated feeder air piston;

Fig. 14 is a vertical sectional view taken on line 14—14 of Fig. 13;

Fig. 15 is a transverse sectional view taken on line 15—15 of Fig. 13;

Fig. 16 is an elevational view of the slidable clamp used in the mechanism of my invention;

Fig. 17 is an elevational view of the cutting knife associated with the clamping mechanism of my invention;

Fig. 18 is a fragmentary longitudinal sectional view on an enlarged scale of the feeder air piston mechanism taken on line 18—18 of Fig. 13; and Fig. 19 is a schematic line diagram illustrating the sequential control means for the pulling, measuring, forming and cutting mechanism in the automatic machine of my invention.

Figure 1:
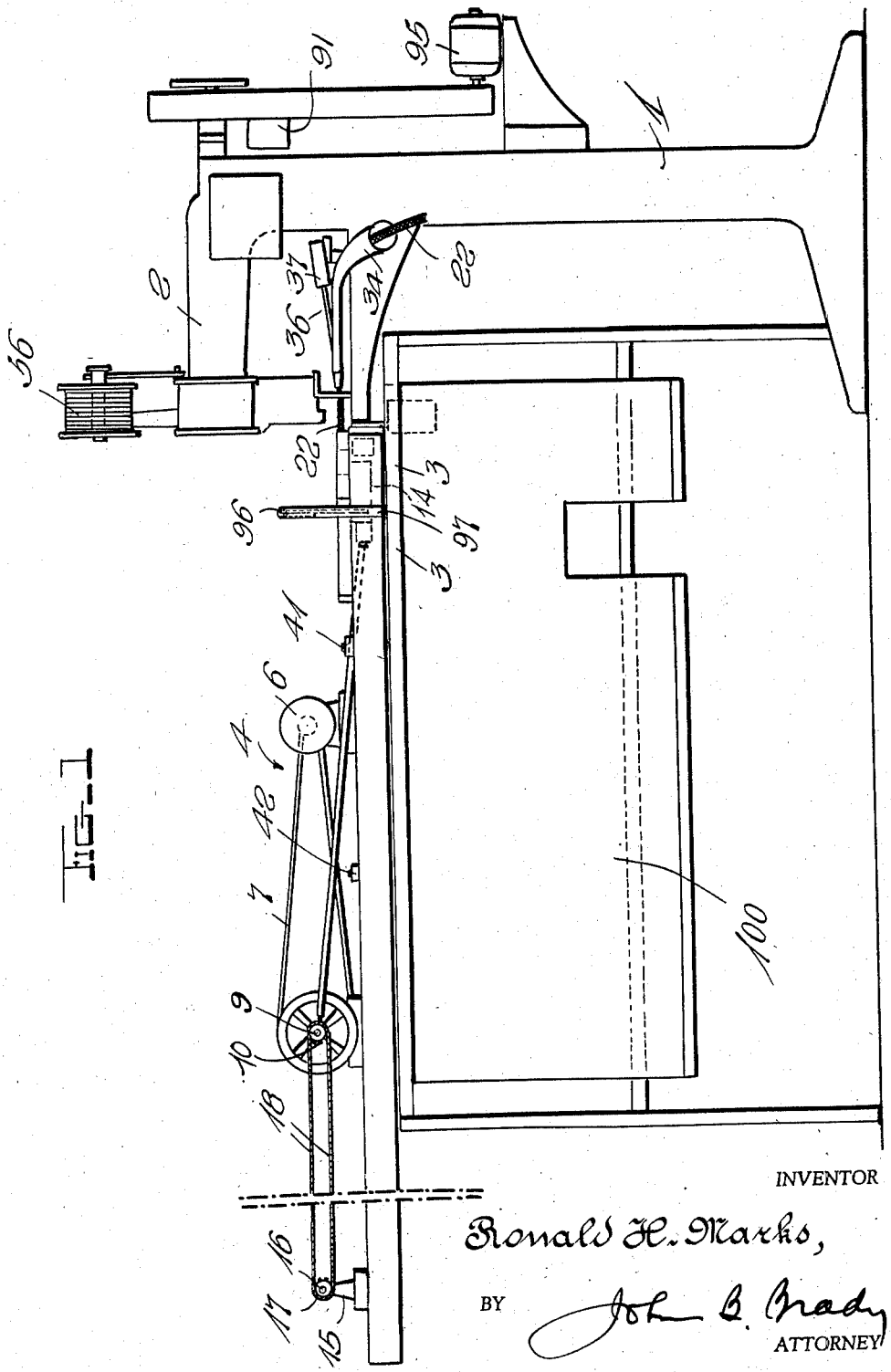
Figure 1 is a front elevational view of the automatic machine for pulling, measuring, forming and cutting mechanism of my invention.

My invention is directed to a machine I have designated as Pul-Clozer by which bags may be stapled and cut in correct lengths at high speed by an automatic operation. The automatic machine of my invention has been illustrated particularly as applied to the pulling, measuring, forming and cutting of bags which are formed from seamless circular tubular knitted paper material. While the machine of my invention is illustrated as particularly adapted for the high speed production of paper bags of the type set forth in my copending application for Letters Patent of the United States Serial No. 358,347, filed May 29, 1953, for Paper Seamless Circular Tubular Knitted Product, now Patent 2,721,462, dated Oct. 25, 1955, I realize that the machine of my invention has general application in industry and I desire that my invention be considered in the illustrative sense and not in the limiting sense. The machine of my invention has been developed to operate at a rate of the order of 15,000 pieces of tubular material, such as bags, 33 inches in length, per eight-hour day. The machine operates substantially unattended so that when two such machines are assembled for simultaneous operation it is entirely practical to perform 30,000 closing operations per day, per operator.

Although I have described the automatic machine as operating to pull, measure, form and cut bags from seamless tubular circular knitted material, the machine of my invention is also adapted for operation on material generally such as cotton, plastic, jute, wool, etc.

The machine assembly of my invention comprises a horizontally extending bed with a projection from one end with which a clamping device is associated and with respect to which a jaw-type puller engages the open end of the tubular material and advances the tubular material horizontally from the clamping mechanism to a position where the tubular material is severed and is directed into a collection receptacle beneath the chassis of the machine. The clamping device has associated therewith a cutting knife which functions after the clamping function is completed for severing the closed end of the tubular material and enabling the tubular material to be pulled longitudinally of the bed of the machine. During this operation the closed end of the tubular material is drawn beneath a resilient laminated rubber guide which breaks the tension on the tubular pieces or bags and directs the pieces or bags into the accumulating receptacle beneath.

This machine provides accurate count by a counting device of the number of pieces or bags being closed and formed of tubular material. It is so constructed that one operator can operate two of the machines at the same time, thereby increasing the productive capacity of the machines to approximately 30,000 pieces or bags per day per operator. This machine, because of its accuracy of measurement and its large capacity when used either singularly or as a duplicate installation, is of great value in the manufacturing process and the reduction of labor costs.

The machine assembly may be used without the clamping attachment as a pulling, measuring, and cutting mechanism or by adding the clamping mechanism the functions of the automatic machine are increased to include the closing of the seamless tubular circular knitted material into bags before the cutting operation.

The unit, when used without the attachment for cutting, may be used in operation for stapling and measuring to required lengths. It has great advantage over manual methods of accomplishing the same operation because it can be set at a constant speed without the human element of fatigue or error. The unit can also be used in machine-shop application, and synchronized with such equipment as punch presses and the like, to remove or pull away the material being fabricated. The use of the unit for this purpose would result in a reduction of danger to the operator from hand injury since the pulling apparatus would enter in the dangerous area of the machine instead of the hand of the human operator.

Referring to the drawings in more detail, reference character 1 designates the frame of the machine including the head 2, which extends over the bed 3. The bed 3 supports the motor system 4 which operates the pulling mechanism, designated generally at 5. While I have illustrated an electric motor system 4, forming part of the pulling mechanism, it will be understood that an air-operated or a hydraulic cylinder device may be employed.

In the arrangement shown, the single phase 110 v. ⅓ H. P. motor 6 drives belt 7 which is engaged over the pulley 8 on the transversely arranged countershaft 9 journaled above the bed 3 and carrying the sprocket wheel 10. The bed 3 of the machine supports a pair of rails 11 and 12 between which the carriage 14 slides. One of the rails 11 provides a support for an adjustable pillow block 15 which may be moved toward or away from sprocket wheel 10. The pillow block 15 serves as a journal for transverse shaft 16 which supports the sprocket wheel 17 alignable with the sprocket wheel 10. Different length sprocket chains 18 may be looped around the sprocket wheels 10 and 17 according to the length of the material which is to be advanced for each stroke of the machine. That is to say, the distance between the slidably supported sprocket wheel 17 and the fixed sprocket wheel 10 is selected according to the lengths in which the material, upon which the machine operates, is to be measured and severed.

The sprocket chain 18 serves as a connecting means for the connecting rod 20 which is adjustably connected at one end 19 to the sprocket chain 18 and is pivotally connected at the other end 21 to the slidable carriage 14. By providing different length sprocket chains 18 the stroke of connecting rod 20 may be determined for pulling the material designated at 22 to selected lineal distances preparatory to a measuring, forming and cutting operation.

The slidable carriage 14 operating between rails 11 and 12 serves as a support for the air cylinder 23 which controls a piston which operates a jaw cam 24. The jaw cam 24 controls the movement of a pair of coacting jaws 25 which are pivoted at 26 with respect to the carriage 14 for movement in a substantially horizontal plane. The coacting jaws 25 are biased to open position by means of coil spring 27 so that the coacting ends of jaws 25 are normally spaced as represented at 28 in Fig. 9. However, the jaws 25 may be closed to grip the end of material 22 as represented in Figs. 2, 3 and 6 by a longitudinal thrust of the jaw cam 24 under control of the piston 29 in air cylinder 23. The piston 29 operates against the action of the spring 30 to force jaw cam 24 forward when air is admitted through pipe line 31 into the air cylinder 23. Upon forward projection of jaw cam 24 the jaws 25 close over the end of material 22. With the jaws 25 closed over the end of the material 22, movement of the carriage 14 by the pull exerted on connecting rod 20 by reason of the attachment of the connecting rod to the sprocket chain 18 results in the advancing of material 22 lineally of the bed of the machine as represented more clearly in Fig. 6.

The cut-off mechanism is shown more clearly in Figs. 13–18 and includes a cutting die 32 apertured at 33 through which the seamless tubular knitted paper material 22 passes. The material 22 is fed to the cutting die 32 through the feeder tube 34 with the aid of the feeder finger 35 which passes in an annular direction through the slot 34a in the feeder tube 34 and engages the material 22 for pushing the material forward in coaction with the pulling force exerted on the material 22 by the movement of the clamping jaws 25. The feeder finger 35 is actuated by the piston rod 36 which extends outwardly from the feeder air cylinder 37 and the associated pneumatic piston carried by piston rod 36 and reciprocative within the feeder air cylinder 37. A guide shoe 38 coacting with the straight arm 39 of the frame of the machine maintains the feeder finger 35 in a lineal path of movement in alignment with the piston rod 36. Air is supplied to the feeder air cylinder 37 in timed relation to the movement of the pulling mechanism 18—25 according to the operation of the limit switches 40, 41 and 42 coacting with the lineal movable slide cam 43 as will be hereinafter described in more detail.

The cutting die 32 coacts with a movable cutting knife 44 which is supported on the slide box 45. The cutting knife 44 is provided with lineally extending slots 46 and 47 through which the cutting knife drive lug 48 and the anvil 49 extend as shown more clearly in Figs. 13 and 14. The cutting knife lug 48 is carried by the driver slide 50 shown more clearly in Fig. 16. The upper end of the driver slide 50 is connected by the member 51 with the driver link 52 for reciprocating the cutting knife 44 in a vertical direction for severing the knitted material 22 with each downward stroke of cutting knife 44. The driver slide 50 coacts with the former-housing 53 as shown more clearly in Fig. 15 where the driver slide 50 is confined for movement in a vertical reciprocatory path by means of the former-legs 54. The driver slide 50 coacts with the anvil 55 to which the wire is fed from the reel indicated at 56 in Fig. 7 for forming the clinching staples for enveloping the bunched seamless tubular circular knitted paper material, as shown at 57 in Fig. 16. The stapling wire from reel 56 is fed through guide tube 58 and adjacent the vertical member 59 to a position between feed rolls 60 to guide tube 61 where it is delivered to the slot 62 in anvil 55. Lengths of the wires 56 are cut off by the circular cutting edge 63 of the driver slide 50 and forced around the bunched seamless tubular circular knitted paper material 22 as shown in Fig. 16 by the shaping of the staple 57 insured by the shaped anvil plate 64. The material 22 is clamped in position by the pressure afforded by the V-notch 65 in plate 66 when the clamping bar 67 is moved upwardly about pivot 68 as shown more clearly in Figs. 7 and 7a under control of the link 69 which is controlled in movement by the solenoid 70.

Solenoid 70 is excited in time relation to the movement of the cutting knife 44 and the movement of the material 22 through the machine by aid of the feeder finger 35 and the pulling jaws 25 as more clearly shown in the timing circuit of Fig. 19. In this arrangement the input to a source of 110—115 single phase 60 cycle current of the conventional lighting circuit is connected to leads 71 and supplied through switch 72 to the timing circuit which includes the start switch 73, meter 74 and the stop switch 75 coordinated with contactors 76, 77, 78, 79, 80, 81 and 82. The limit switches 40 and 42 described in connection with Figs. 2 and 8 are represented in the diagram of Fig. 19 by the same reference characters. Limit switch 40 controls relay winding 89 and controlling contactors 79. Limit switches 41 and 42 control the solenoid windings 87 and 70 as shown. The two-position limit switch 86 when connected to contact 92 controls relay winding 90 and when connected in position 93 controls solenoid 91 through contactors 81. A toggle switch 94 is provided for connecting the timing circuit to the power supply system. Motor 6 which drives the pulling mechanism connects to the power supply circuit as shown and motor 95 which drives the wire feed mechanism for the stapling operation connects to the power supply system in a similar manner.

The operating sequence of the machine in my invention will be understood by reference to Figs. 19 and 8. Limit switch 40 is closed by the position of slide cam 43 energizing relay winding 89 through contactors 79 with limit switch 88 closed. This energizes air valve solenoid 83 actuating air cylinder 23 to move cam 24 for clamping the jaws 25 over the end of the work 22. The shuttle rod 20 then commences the pulling stroke toward the left, viewing the machine as in Figs. 2 and 8 with the jaws 25 remaining clamped upon the end of the work 22 when limit switch 40 opens.

The slide cam 43 moves in a lineal path past the one-way limit switch 41. No action occurs at this particular movement. Slide cam 43 closes limit switch 42 thus energizing solenoid 70. This raises the clamping bar 67 and also operates the two-position limit switch 86, moving the switch to position 93 which closes the circuit through relay contactors 81 by energizing solenoid 91 which operates the stapling machine clutch. This results in the operation of the stapling driver link 69 from driving motor 95 for moving the driver slide 50 for driving a staple such as 57 as shown in Fig. 16 to closing the end of the work 22. Simultaneously the work 22 is cut off by the movement of knife 44 by the positive drive from the cutting knife drive 48 operated from the driver slide 50 as shown more clearly in Figs. 13 and 14. When the machine operates, normally closed limit switch 88 represented in Figs. 8 and 19 opens. This drops out relay windings 89 and 90. Relay winding 89 de-energizes air valve solenoid 83 and the work 22 is released from jaws 25. The relay contactors 81 open the circuit through solenoid winding 81 declutching the stapling machine. Limit switch 88 is closed when the stapling machine completes the stroke of driver link 52 and member 51 operating driver slide 50 but relay windings 89 and 90 remain de-energized.

The slide cam 43 holds the limit switch 42 open until after shuttle rod 20 begins its return stroke and slide cam 43 releases limit switch 42. This de-energizes solenoid 70 and clamping bar 67 drops releasing the two-position limit switch 86 and moving the contactor thereof to position 92 backing up relay winding 90 and thus preparing the stapling machine for its next operating cycle.

Limit switch 41 is closed by slide cam 43 energizing air valve operating solenoid 87. Cylinder 37 is thus supplied with air and moves piston rod 36 outwardly enabling feed finger 35 to engage the work 22 as represented in Figs. 10, 13 and 18 pushing out a new length of work 22 to be grasped by the jaws 25. The limit switch 41 is released by slide cam 43 de-energizing the solenoid 87 by permitting the feed finger 35 to return to retracted position.

The shuttle rod 20 completes the return stroke whereupon limit switch 40 closes and picks up relay winding 89, whereupon the operating cycle repeats. As heretofore explained, the speed of operation is of the order of 15,000 pieces of tubular material such as bags, 33 inches in length, per eight hour day. Thus it will be seen that very rapid operation of the machine components is obtained.

One of the contributing factors to the high speed operation is the manner in which the tubular material 22 is discharged from the machine as it is stapled and cut off. Figs. 1, 2, 6, 11 and 12 show the manner of expediting this discharge where a transversely extending bar 96 is disposed horizontally over the lineal path of movement of the material supported by a bracket 97 extending from the frame 1 of the machine and which supports in depending arrangement the rubber deflector pads 98 and 99. The rubber deflector pad 99 extends downwardly upon the terminating edge of deflector pad 98 and tangentially engages the upper surface of the paper seamless circular tubular knitted product 22 as it is pulled and pushed lineally through the machine in a position just beyond the stapling and cut off positions illustrated more clearly in Figs. 1, 2, and 6. Deflector pad 98 backs up or reinforces deflector pad 99 under these conditions as represented in Fig. 11. The work 22 is thus maintained in tension during the lineal dynamic movement thereof. At the instance of severance of the tensioned stapled work 22 the condition represented in Fig. 12 takes place where the work 22 is suddenly released at high speed and the tensioned rubber deflector pad 99 springs by reason of its inherent resilience to a position forcing the end of the work 22 as represented in Fig. 12 downwardly at the same instance that the timing mechanism, heretofore described, operates to release the opposite end of the material 22 from jaws 25. The stapled cut off sections of the material 22 are thus forced downwardly and dropped by gravity upon chute 100 where the finished products are collected in suitable receptacles. The paper seamless circular tubular product 22 of my invention is thus delivered at low cost at a high production rate.

As heretofore pointed out the machine of my invention is readily adjustable to permit different lengths or spans of the stroke of the shuttle rod 20 by selectively fixing the distance between the slidably supported sprocket wheel 17 and the fixed sprocket wheel 10. Different lengths of sprocket chains 18 are provided enabling the shuttle rod 20 to be reciprocated in different lengths of strokes according to the spacing of the spocket wheels 10 and 17 shown in Figs. 1, 2 and 6 and schematically illustrated in Fig. 8.

While I have described my invention in one of its preferred embodiments, I realize that modifications may be made, and I desire that it be understood that no limitations upon my invention are intended except as may be imposed by the scope of the appended claims.

What I claim as new and desire to secure by Letters Patent of the United States is as follows:

1. A machine for cutting paper seamless circular tubular knitted material into lengths, comprising a frame, means mounted on said frame for guiding the material in the form of a tube to be cut in lengths in a lineal path, a slide mounted on said frame and movable longitudinally thereof, gripping means carried by said slide for gripping and pulling the end of the material as a tube to be cut into lengths, means for reciprocating said slide in a lineal path, means for severing the material as a tube at the time the aforesaid means reaches the limit of its lineal travel in one direction, means for disengaging said gripping means at the time said slide reaches the aforesaid limit of travel and prior to the return movement of said slide in the reciprocatory cycle thereof, and means for pushing the material as a tube to be severed into the path of said gripping means for cyclic engagement thereby.

2. A machine for cutting material into lengths as set forth in claim 1, which also includes means for stapling said material as a tube in a position adjacent the end thereof which is to be severed at a time just prior to the severance of said material.

3. A machine for cutting material into lengths as set forth in claim 1 in which said gripping means comprises a pair of jaws normally spring biased to open position for enveloping the end of the tubular material to be severed into lengths, a cam for moving said jaws to closed position and an air actuator for displacing said cam for moving said jaws to a position for gripping the tubular material to be severed at the instant said slide completes each complete forward and return reciprocation in a lineal path.

4. In a machine for cutting material into lengths as set forth in claim 1 in which said severing means comprises a knife, and means for moving said knife in a vertically downward path in coaction with means for raising the tubular material adjacent the severance position thereof in a vertically upward position.

5. A machine for cutting material into lengths as set forth in claim 1 in which the means for guiding the material to be cut into lengths consists of a feeder tube located adjacent the severance position and in which the material is bunched and fed through said feeder tube, a cutting die adjacent the means for severing the material into lengths, said cutting die having a circular aperture therein for the passage of the material in bunched form fed through said feeder tube, said means for severing the material into lengths comprising a knife movable adjacent said cutting die for cutting the material when said gripping means has pulled a predetermined length thereof through said cutting die and while said material is maintained in tension.

6. A machine for cutting material into lengths as set forth in claim 1 in which the means for guiding the tubular material cut into lengths consists of a feeder tube located adjacent the severence position, said feeder tube being slotted at one side thereof, a feeder finger extending through the slot in said tube to a central substantially central position therein spaced from the walls of said tube, means for reciprocating said feeder finger for engaging the material while bunched in tubular form to be severed as it moves through said feeder tube, and pneumatic means for reciprocating said feeder finger for exerting a pusher force on the tubular material to be severed simultaneously with the pulling force exerted thereon by the pull of said gripping means.

7. A machine for cutting material into lengths as set forth in claim 1 in which a depending resilient deflector is located adjacent the severance position for engaging the tubular material in bunched form and while being pulled under tension and operating to deflect the cut lengths of the material in a downward direction as the material is severed.

8. A machine for closing and cutting paper seamless circular tubular knitted products comprising a frame, a feeder tube supported by said frame for feeding a paper seamless circular tubular knitted product in a lineal path through the machine, a cutting die located adjacent the outlet end of the feeder tube, said die including a circular aperture therein slightly larger than the paper seamless circular tubular knitted product fed from the outlet of said feeder tube, a cutting knife movable transversely of said cutting die, a stapling device movable in a path substantially parallel to but spaced from said cutting knife for stapling the paper seamless circular tubular knitted product at a position spaced from said cutting knife and cutting die, means for feeding the paper seamless circular tubular knitted product through said feeder tube, the aperture in said cutting die and past said cutting knife and said stapling device, and means for driving said cutting knife and said stapling device in timed relation to the feeding of the paper seamless circular tubular knitted product through said cutting die.

9. A machine for closing and cutting paper seamless circular tubular knitted products as set forth in claim 8 in which the means for feeding the paper seamless circular tubular knitted product through said feeder tube, the aperture in said cutting die and past said cutting knife and said stapling device comprises an air operated feeder finger for pushing the paper seamless circular tubular knitted product through the outlet of said feeder tube, and a pair of jaws for gripping the free end of said paper seamless circular tubular knitted product through the outlet of said feeder tube and a pair of jaws for gripping the free end of said paper seamless circular tubular knitted product at a position beyond the stapling head for pulling said product lineally of the frame of the machine.

10. A machine for closing and cutting paper seamless circular tubular knitted products as set forth in claim 8 in which a pivoted clamping bar is located at a position adjacent said stapling device and below the axial path of movement of said paper seamless circular tubular knitted product and wherein a coacting face plate is located in vertical alignment with the plane of movement of said pivoted clamping bar and above the axial path of movement of said paper seamless circular tubular knitted product, and electromagnetic means for moving said clamping bar for raising the paper seamless circular tubular knitted product into said face plate at a time period prior to the operation of said stapling device and said cutting knife.

11. A machine for closing and cutting paper seamless circular tubular knitted products as set forth in claim 8 in which a pivoted clamping bar is located at a position adjacent said stapling device and below the axial path of movement of said paper seamless circular tubular knitted product and wherein a coacting face plate is located in vertical alignment with the plane of movement of said pivoted clamping bar and above the axial path of movement of said paper seamless circular tubular knitted product, electromagnetic means for moving said clamping bar for raising the paper seamless circular tubular knitted product into said face plate at a time period prior to the operation of said stapling device and said cutting knife, and a resilient deflecting device located in a position spaced from said clamping bar and said face plate, said deflecting device engaging said paper seamless circular tubular knitted product while in tension for directing said product downwardly to a discharge position subsequent to each cutting and release operation of each cut length of the paper seamless circular tubular knitted product.

References Cited in the file of this patent
UNITED STATES PATENTS

| Number | Name | Date |
|---|---|---|
| 517,587 | Parks | Apr. 3, 1894 |
| 1,976,318 | Young | Oct. 9, 1934 |
| 2,148,248 | Swangren | Feb. 21, 1939 |
| 2,232,496 | Thompson | Feb. 18, 1941 |
| 2,593,585 | Madgwick | Apr. 22, 1952 |
| 2,611,609 | Hagopian | Sept. 23, 1952 |